(12) United States Patent
Dengler (10) Patent No.: US 10,828,136 B2
(45) Date of Patent: Nov. 10, 2020

(54) ATTACHMENT WITH RESONANT STRUCTURE FOR PERSONAL CARE APPLIANCE METHOD

(71) Applicant: KONINKLIJKE PHILIPS N.V., Eindhoven (NL)

(72) Inventor: Evan Dak Wah Dengler, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 507 days.

(21) Appl. No.: 15/504,181

(22) PCT Filed: Aug. 21, 2015

(86) PCT No.: PCT/IB2015/056345
§ 371 (c)(1),
(2) Date: Feb. 15, 2017

(87) PCT Pub. No.: WO2016/027258
PCT Pub. Date: Feb. 25, 2016

(65) Prior Publication Data
US 2017/0273769 A1    Sep. 28, 2017

Related U.S. Application Data

(60) Provisional application No. 62/039,934, filed on Aug. 21, 2014.

(51) Int. Cl.
*A61C 17/22* (2006.01)
*A61C 17/34* (2006.01)
*H02K 33/00* (2006.01)

(52) U.S. Cl.
CPC .......... *A61C 17/3472* (2013.01); *A61C 17/22* (2013.01); *A61C 17/221* (2013.01);
(Continued)

(58) Field of Classification Search
CPC . A61C 17/221; A61C 17/222; A61C 17/3418; A61C 17/3472
See application file for complete search history.

(56) References Cited

U.S. PATENT DOCUMENTS 4,156,620 A    5/1979  Clemens
5,613,259 A    3/1997  Craft et al.
(Continued)

FOREIGN PATENT DOCUMENTS

EP    2000047 A2    12/2008
EP    2018831 A1    1/2009
(Continued)

*Primary Examiner* — Randall E Chin (57) ABSTRACT

A personal care appliance (10), or power toothbrush, comprises a handle (16) including a drive train (20), a motor controller (18), and an attachment (12) that includes a resonant structure (14). The motor controller (18) controls an operation of the drive train (20) to produce at least one of a first mechanical stimulus and a second mechanical stimulus, the first mechanical stimulus comprising a first cleaning motion (42) having a first resonant frequency, the second mechanical stimulus comprising a second movement having a second resonant frequency. The resonant structure (14) implements the first cleaning motion (42) and an additional resonant motion (44,46,48,50,52,60) as well as the cleaning motion (42).

17 Claims, 6 Drawing Sheets

(52) U.S. Cl.
CPC ........ *A61C 17/222* (2013.01); *A61C 17/3418* (2013.01); *H02K 33/00* (2013.01)

(56) References Cited

U.S. PATENT DOCUMENTS

| | | | |
|---|---|---|---|
| 8,397,332 B2* | 3/2013 | Kraus | A61C 17/32 15/22.1 |
| 2004/0168269 A1 | 9/2004 | Kunita et al. | |
| 2004/0261203 A1 | 12/2004 | Dworzan | |
| 2005/0060822 A1 | 3/2005 | Chenvainu et al. | |
| 2005/0091767 A1 | 5/2005 | Jimenez et al. | |
| 2006/0000036 A1* | 1/2006 | Eliav | A46B 15/0002 15/22.1 |
| 2008/0238182 A1 | 10/2008 | Fischer et al. | |
| 2010/0306942 A1 | 12/2010 | Kressner et al. | |
| 2011/0005015 A1 | 1/2011 | Iwahori et al. | |
| 2011/0010875 A1 | 1/2011 | Iwahori et al. | |
| 2012/0216635 A1 | 8/2012 | Headstrom | |
| 2013/0029290 A1* | 1/2013 | Utsch | A61C 17/3436 433/147 |
| 2013/0198980 A1 | 8/2013 | Iwahori et al. | |

FOREIGN PATENT DOCUMENTS

| | | |
|---|---|---|
| RU | 2244326 C1 | 1/2005 |
| WO | 2003017865 A1 | 3/2003 |
| WO | 2007096167 A1 | 8/2007 |
| WO | 2013093709 A1 | 6/2013 |

\* cited by examiner

ATTACHMENT WITH RESONANT STRUCTURE FOR PERSONAL CARE APPLIANCE METHOD

CROSS-REFERENCE TO PRIOR APPLICATIONS

This application is the U.S. National Phase application under 35 U.S.C. § 371 of International Application No. PCT/IB2015/056345, filed on Aug. 21, 2015, which claims the benefit of U.S. Provisional Patent Application No. 62/039,934, filed on Aug. 21, 2014. These applications are hereby incorporated by reference herein.

BACKGROUND

The present embodiments relate generally to personal care appliances, such as power toothbrushes, and more particularly, to an attachment with a resonant structure for a personal care appliance and a method of implementing motion with the resonant structure.

In conjunction with oral healthcare, a primary principle of plaque removal with a toothbrush (e.g., a power toothbrush) is to get sufficient bristle tip pressure to plaque. Increasing the area that bristle tips access will increase clinical results for users. Traditionally, the best ways of doing this are through providing additional bristles to the brush head of the power toothbrush. However, a disadvantage of providing additional bristles is that it requires a larger platen, or larger bristle amplitudes which require a larger motor output. Another disadvantage is that larger platens reduce in-mouth access to hard-to-reach locations like the molar interproximal regions, and also vastly increase motor load since the moment of inertia of the brush head increases. Large motor amplitudes are difficult to implement with current drive trains and have vastly increased power requirements, which is undesirable.

Accordingly, an improved method and apparatus for achieving larger bristle tip coverage, without larger platens or power hungry drive train motors, for overcoming the problems in the art is desired.

SUMMARY

In accordance with one aspect, an attachment for a personal care appliance is disclosed which includes resonant structures as an innovative way of getting new motions and benefits beyond the typical bristle sweep from a personal care appliance's movement. The embodiments of the present disclosure advantageously provide novel ways for implementing resonant structures, using current manufacturing technologies, and how these benefits could be modelled and optimized.

According to one embodiment, a personal care appliance comprises a handle, a motor controller, and an attachment. The handle includes a drive train and a drive shaft. The motor controller is configured for controlling operation of the drive train to produce at least one of a first mechanical stimulus and a second mechanical stimulus. The attachment has a body with a principal axis extending between a proximal end and a distal end of the attachment, wherein the proximal end couples to the drive shaft and wherein the distal end includes an attachment resonant structure. In response to a first mechanical stimulus, the attachment resonant structure implements a cleaning motion and (ii) in response to the second mechanical stimulus, the attachment resonant structure implements the cleaning motion and an additional motion as well as the cleaning motion, such as a motion along a trajectory having an angle greater than zero with respect to the principal axis.

In another embodiment, the attachment resonant structure comprises one selected from the group consisting of at least one branch of cantilevered bristles, at least one set of bristles, a cantilevered platen, a plurality of pliable structures, center bristle tufts within the plurality of pliable structures, and any combination thereof. In an embodiment wherein the resonant structure comprises the at least one branch of cantilevered bristles, the additional motion comprises a tapping motion. In an embodiment wherein the resonant structure comprises the at least one set of cantilevered bristles, the additional motion comprises an oscillating motion (e.g., an oscillating resonant motion) including at least one selected from the group consisting of (i) along the principal axis and (ii) perpendicular to the principal axis. In another embodiment wherein the resonant structure comprises the cantilevered platen, the additional motion comprises at least one selected from the group consisting of (i) a wagging motion and (ii) a waving motion. In yet another embodiment wherein the resonant structure further includes the plurality of pliable structures located in a central region and extending from a principal surface of the resonant structure, the additional motion comprises a flowing motion. The resonant structure can further include center bristle tufts within the plurality of pliable structures, and wherein the additional motion comprises the flowing motion.

In yet another embodiment, a method of implementing additional motion in a personal care appliance comprises providing a handle including a drive train and a drive shaft. The method further comprises controlling, via a motor controller, operation of the drive train to produce at least one of a first mechanical stimulus and a second mechanical stimulus. The method still further comprises providing an attachment having a body with a principal axis extending between a proximal end and a distal end of the attachment, wherein the proximal end couples to the drive shaft and wherein the distal end includes a resonant structure. Responsive to controlling, via the motor controller, operation of the drive train to produce the first mechanical stimulus, the resonant structure implements a cleaning motion. Responsive to controlling, via the motor controller, the operation of the drive train to produce the second mechanical stimulus, the resonant structure implements an additional motion in addition to the cleaning motion.

In one embodiment of the method, the additional motion comprises a resonant motion in addition to the cleaning motion that includes a motion along a trajectory having an angle greater than zero with respect to the principal axis. In another embodiment of the method, the resonant structure includes at least one selected from the group consisting of at least one branch of cantilevered bristles, at least one set of cantilevered bristles, a cantilevered platen, a plurality of pliable structures, or center bristle tufts within the plurality of pliable structures, and any combination thereof.

The embodiments of the present disclosure advantageously solve the problem of providing an improved method and apparatus that achieves larger bristle tip coverage, without larger platens or power hungry drive train motors.

Resonant structures in attachments are beneficial for a number of reasons. For example, an attachment with a resonant structure for enabling wagging and/or additional movements of the attachment advantageously provides for an additional power tip movement from the resonant structure. In addition, the wagging and/or additional movement of the resonant structure could potentially clean areas in the hard-to-reach zones that were previously inaccessible. Furthermore, additional bristle motions and attachment movements can provide for additional unique features available on a personal care appliance.

The resonant structures according to the embodiments of the present disclosure advantageously provide for an improved performance of the attachment. Both in-mouth feel and plaque removal can be enhanced with resonance. Larger movements of the attachment bristles result in more mouth coverage and thus more plaque removal, which can be carefully balanced and/or weighed against any potentially negative in-mouth perceptions, e.g., from bristle whip. Furthermore, massaging and/or tapping via the resonant structures of the attachment can be also used to deliver new sensations to teeth and gums.

The resonant structures according to the embodiments of the present disclosure can further advantageously provide a lifecycle indicator. Resonant structures have inherent stress concentration/fatigue points due to their additional movements. Accordingly, resonant structures of the attachment can be tuned so that appropriate fatigue points act as attachment replacement indicators (e.g., loss of additional vibrations, loss of stiffness in structure, visual fatiguing, etc.).

Still further advantages and benefits will become apparent to those of ordinary skill in the art upon reading and understanding the following detailed description.

BRIEF DESCRIPTION OF THE DRAWINGS

The embodiments of the present disclosure may take form in various components and arrangements of components, and in various steps and arrangements of steps. Accordingly, the drawings are for purposes of illustrating the various embodiments and are not to be construed as limiting the embodiments. In the drawing figures, like reference numerals refer to like elements. In addition, it is to be noted that the figures may not be drawn to scale.

FIG. 2 includes FIGS. (2A,2B) which show two side view illustrations of an attachment with a resonant structure in which an additional motion includes a tapping motion, and FIGS. (2C,2D) which show top views of two different resonant structures according to an embodiment of the present disclosure;

FIG. 3 (3A,3B) is a side view illustration of an attachment with a resonant structure in which an additional motion includes a sinusoidal motion according to embodiments of the present disclosure;

FIG. 4 (4A,4B) is a side view illustration of an attachment with a resonant structure in which an additional motion includes an arching motion according to an embodiment of the present disclosure;

FIG. 5 (5A,5B) is a top view illustration of an attachment with a resonant structure in which an additional motion includes a wagging motion according to an embodiment of the present disclosure;

FIG. 6 (6A,6B) is a bottom view illustration of an attachment with a resonant structure in which an additional motion includes a waving motion according to an embodiment of the present disclosure;

FIG. 7 (7A,7B,7C) is a cross-sectional view of an attachment, taken along line 7-7 of FIG. 6B, illustrating the waving motion according to an embodiment of the present disclosure; and FIG. 8 (8A,8B,8C,8D) is an illustrative view of an attachment with a retention resonant structure according to an embodiment of the present disclosure.

DETAILED DESCRIPTION

The embodiments of the present disclosure and the various features and advantageous details thereof are explained more fully with reference to the non-limiting examples that are described and/or illustrated in the drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the present disclosure. The examples used herein are intended merely to facilitate an understanding of ways in which the embodiments of the present may be practiced and to further enable those of skill in the art to practice the same. Accordingly, the examples herein should not be construed as limiting the scope of the embodiments of the present disclosure, which is defined solely by the appended claims and applicable law.

It is understood that the embodiments of the present disclosure are not limited to the particular methodology, protocols, devices, apparatus, materials, applications, etc., described herein, as these may vary. It is also to be understood that the terminology used herein is used for the purpose of describing particular embodiments only, and is not intended to be limiting in scope of the embodiments as claimed. It must be noted that as used herein and in the appended claims, the singular forms "a," "an," and "the" include plural reference unless the context clearly dictates otherwise.

Unless defined otherwise, all technical and scientific terms used herein have the same meanings as commonly understood by one of ordinary skill in the art to which the embodiments of the present disclosure belong. Preferred methods, devices, and materials are described, although any methods and materials similar or equivalent to those described herein can be used in the practice or testing of the embodiments.

According to the embodiments of the present disclosure, the resonant structures for an attachment for a personal care appliance rely on vibration properties of the attachment when placed under a prescribed excitation from the drive train of the personal care appliance. Resonance can occur in various places and in various ways. For example, resonance can occur as a function of one or more of torsional rotation of the attachment, flexural vibration of the attachment, wiggle of attachment tip, wave vibrations in the platen, bristle whip, etc.

Resonance of a particular structure comprised of a given material is dependent on the material's speed of sound, the geometry of the structure's shape, as well as the way that the particular structure is attached to adjacent structures. Also, paramount to driving resonances is the drive train output used for driving resonances. There are a number of different ways in which a resonant structure attachment can be created and stimulated.

For transverse bending of an idealized cantilever beam, the following equation of motion describes its behaviour:

$$EI\frac{\partial^4 y}{\partial x^4} + \rho A \frac{\partial^2 y}{\partial t^2} = 0,$$

where "E" is material stiffness—modulus of elasticity; "I" is geometry/mass distribution—moment of inertia; "ρ" is mass density; "A" is cross-sectional area; "x" is the distance from the base of a beam to a point of interest; "y" is the perpendicular distance that the point of interest travels during bending; and "t" is time.

Solving for the natural vibrational frequencies of the object, we get the following equation:

$$\omega^2 = \frac{EI}{\rho A} k^4,$$

where the natural frequencies "ω" are dependent on the following variables: material stiffness—modulus of elasticity, "E"; geometry/mass distribution—moment of inertia, "I"; mass density, "ρ"; cross-sectional area, "A"; and "k", which is the corresponding wave number for the given natural frequency. With respect to resonant excitation, the inventor has found that by designing the resonant frequencies of the attachment resonant structure to match a given output (or outputs) of the drive train, resonant behaviour is exhibited.

Resonance has been demonstrated in several prototypes that utilize the bristles or the platen as resonant structures in attachments. The resonance of the resonant structure in the attachment is mechanically driven from the drive train located in the handle of the personal care appliance. The resonant structure in the attachment is designed appropriately to respond to the mechanical stimulus from the drive train. Examples of resonance include (i) platen "tapping" which can provide potential massage or interproximal benefit, (ii) attachment "wiggling" which can provide potential increased power tip accessibility, (iii) bristle amplitude or bristle "whip" which can provide potential increased plaque removal and gum-line cleaning, and (iv) rubber structures which can provide potential toothpaste retention, for example, at the center of the structure at the distal end of the attachment.

Figure 1:
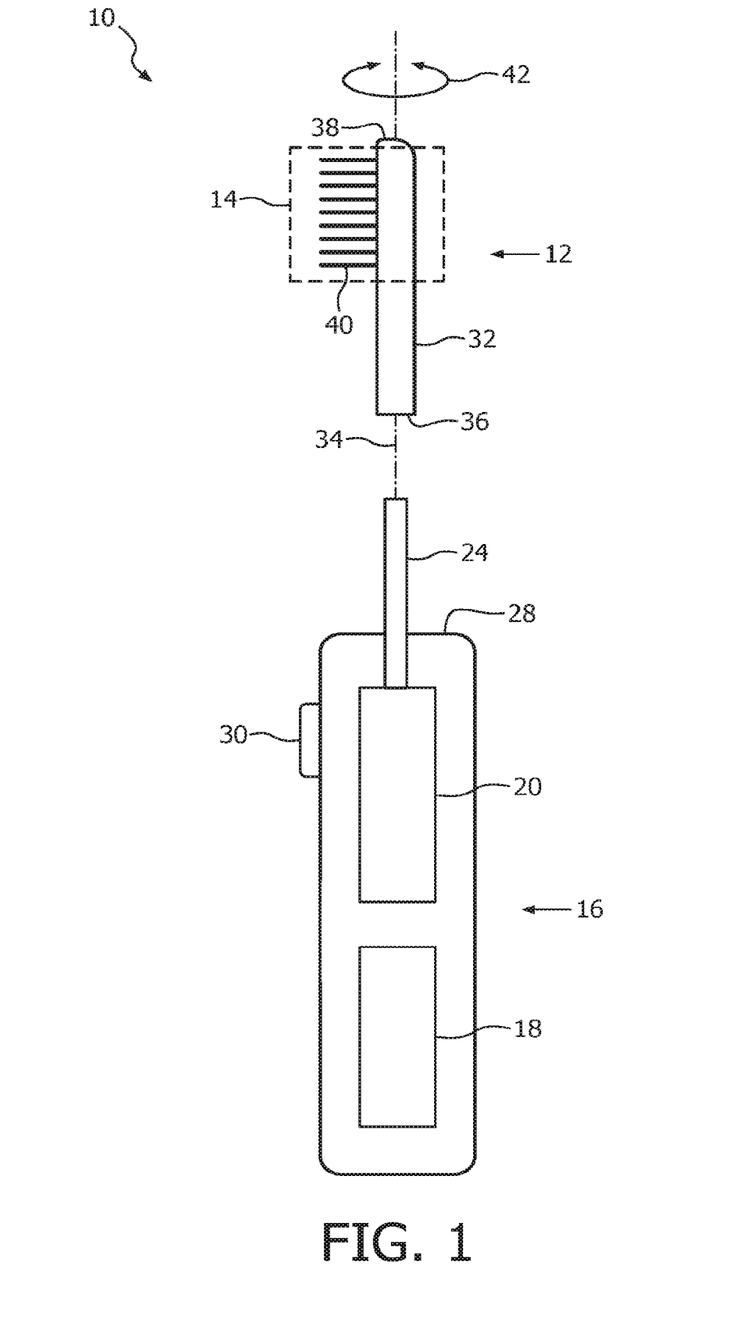
FIG. 1 is a schematic view of a personal care appliance, such as a power toothbrush, having an attachment with a resonant structure according to an embodiment of the present disclosure.

With reference now to FIG. 1, there is shown a schematic view of a personal care appliance 10 of the present disclosure. According to the embodiments of the present disclosure, the personal care appliance 10 comprises a handle 16, a motor controller 18, and an attachment 12 with a resonant structure 14. In one embodiment, attachment 12 comprises a replaceable attachment. The personal care appliance 10 preferably comprises a power toothbrush. The handle 16 includes a drive train 20 and a drive shaft 24. The drive shaft 24 also extends from the distal end 28 of handle 16.

Motor controller 18 (i.e., control electronics) comprises any suitable controller, microcontroller, processor, power source and/or other electronics to provide power and control signals for implementing the various functions, or any combination thereof, as discussed further herein. In addition, the personal care appliance 10 further comprises an activation button 30 (or an equivalent mechanism) that is operable between (i) an OFF state and (ii) at least one activation ON state. The at least one activation ON state can comprise one or more operation states for implementing various care routines and/or operations with the personal care appliance 10, as discussed herein. In addition, the at least one activation ON state includes a suitable procedure and/or control routine with respect to implementing resonance of a resonant structure in conjunction with a care routine and/or operation.

In one embodiment, motor controller 18 is configured for controlling an operation or operations of the drive train 20 to produce at least one of a first mechanical stimulus and a second mechanical stimulus. For example, the first mechanical stimulus can comprise a sweeping cleaning movement having a first resonant frequency and the second mechanical stimulus can comprise a movement having a second resonant frequency. In another embodiment, the motor controller 18 is configured for controlling an operation of the drive train between an OFF state and at least one of (i) a first mechanical movement having a first resonant frequency and (ii) a second mechanical movement having a second resonant frequency.

With reference still to FIG. 1, the attachment 12 has a body 32 with a principal axis 34 extending between a proximal end 36 and a distal end 38 of the attachment 12. The proximal end 36 couples, via a press fit or other suitable coupling mechanism, to the portion of drive shaft 24 extending from the distal end 28 of handle 16. The distal end 38 of the attachment 12 includes a resonant structure 14, which can include bristles 40, configured according to the requirements of a specific application of the attachment.

In operation, responsive to the motor controller 18 operating to control an operation of the drive train 20 to produce the first mechanical stimulus (e.g., a first cleaning movement having a first resonant frequency), the resonant structure 14 implements a cleaning motion 42. Responsive to the motor controller 18 operating to control the operation of the drive train 20 to produce the second mechanical stimulus (e.g., a second movement having a second resonant frequency), the resonant structure 14 implements the cleaning motion 42 and at least one additional motion (44, 46, 48, 50, 52) as well as the cleaning motion 42, as will be discussed further herein with reference to various embodiments of the resonant structure 14, below.

The resonant structure 14 is selected from the group consisting of at least one branch of cantilevered bristles 43, at least one set of cantilevered bristles 45, a cantilevered platen 47, a plurality of pliable structures 56, a center bristle tuft (58) within the plurality of pliable structures (56), and any combination thereof (FIGS. 2-8). The branch of cantilevered bristles" refers to a separate arm of the platen that can move independently from the rest of the platen. The "set of cantilevered bristles" refers to bristles on a flexible platen, where a waveform can be generated within the flexible platen.

Figure 2:
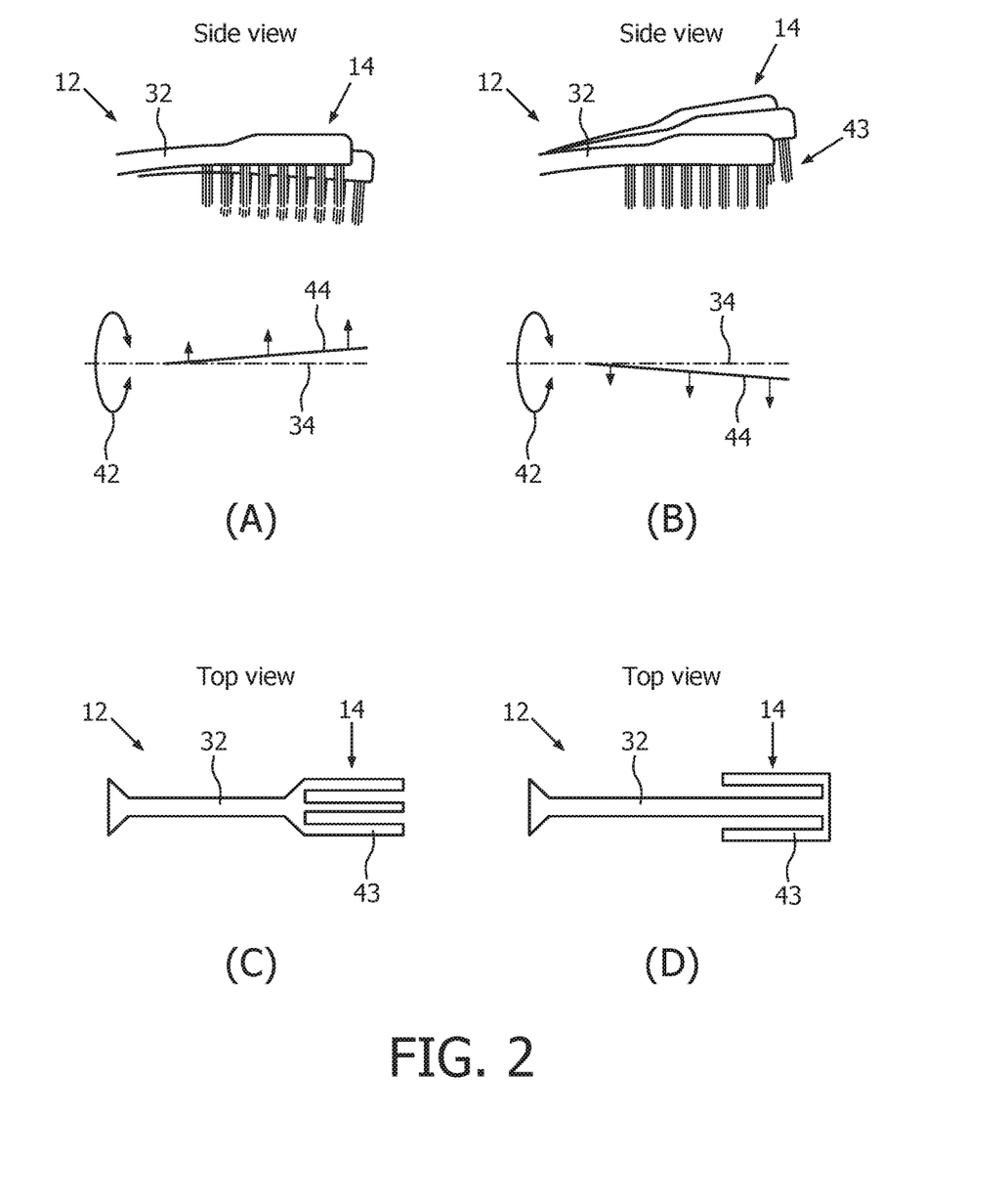

Turning now to FIG. 2, there is shown, in FIGS. (2A,2B), two side view illustrations of an attachment 12 with a resonant structure 14 in which an additional motion includes a tapping motion 44, and, in FIGS. (2C,2D), top views of two different resonant structures according to embodiments of the present disclosure. The resonant structure 14 comprises at least one branch of cantilevered bristles 43 and the additional motion comprises a resonant tapping motion 44. In one embodiment (FIG. 2(A,B,C)), an amplitude of the tapping motion 44 closer to the proximal end 36 of the attachment 12 is smaller than an amplitude of the tapping motion 44 closer to the distal end 38 of the attachment 12. In another embodiment (FIG. 2(D)), an amplitude of the tapping motion 44 closer to the distal end 38 of the attachment 12 is smaller than an amplitude of the tapping motion 44 closer to the proximal end 36 of the attachment 12. In a first example, the at least one branch of cantilevered bristles 43 extend in a manner similar to the prongs of a tuning fork (FIG. 2(C)), and in a second example, the at least one branch of cantilevered bristles 43 extend in a similar manner, only the prongs of the tuning fork are pointing in reverse direction (FIG. 2(D)). In another embodiment, the at least one branch of cantilevered bristles 43 comprises a plurality of branches of cantilevered bristles and the tapping motion 44 includes distinct tapping motions for each branch of cantilevered bristles 43.

Figure 3:
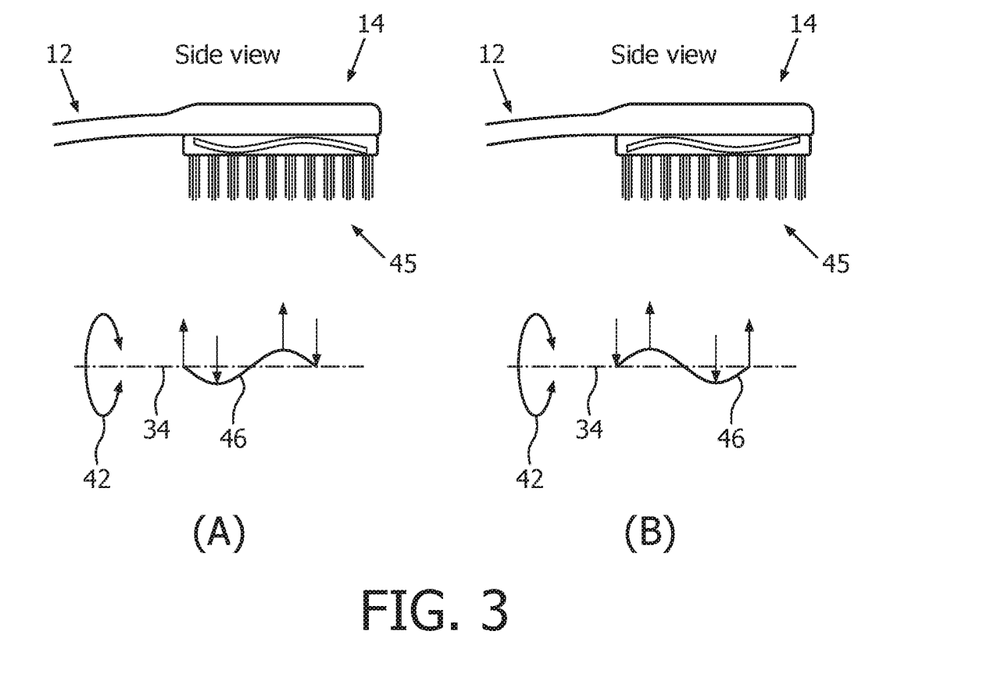

In a second embodiment, as shown in FIG. 3, the resonant structure 14 comprises the at least one set of cantilevered bristles 45 and the additional motion comprises an oscillating or sinusoidal motion 46 including at least one selected from the group consisting of (i) along the principal axis 34 and (ii) perpendicular to the principal axis 34. With reference still to FIG. 3, an amplitude of the oscillating motion 46 between the proximal and distal ends of the at least one set of cantilevered bristles 45 is sinusoidal.

Figure 4:
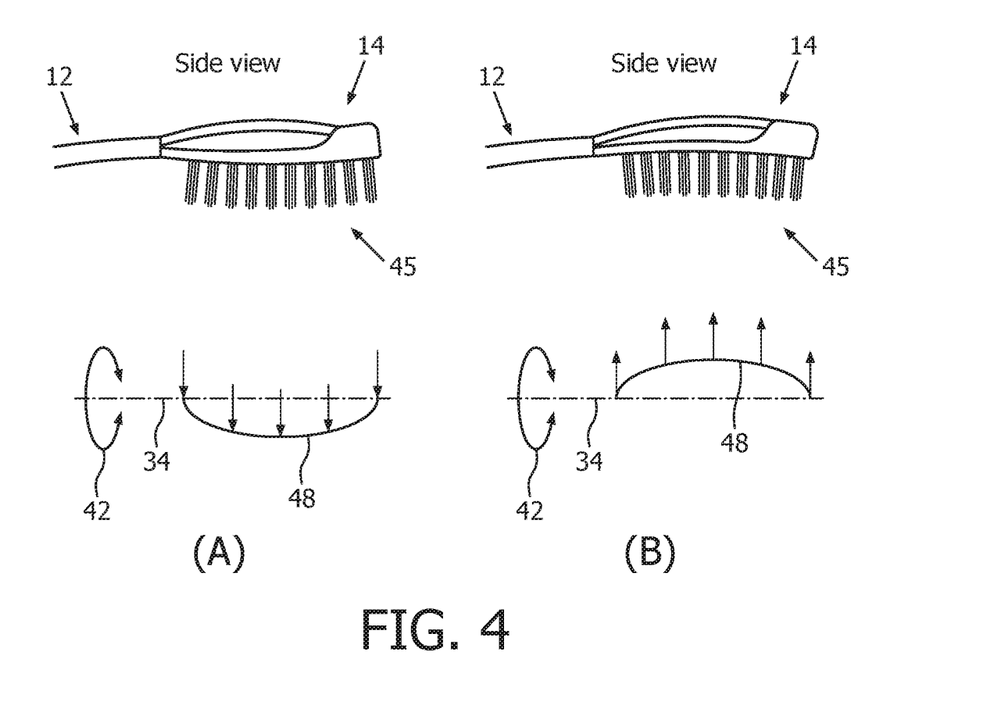

Referring now to FIG. 4, there is shown a side view illustration of an attachment 12 with a resonant structure 14 comprising at least one set of cantilevered bristles 45 and the additional motion is an arching motion 48. With reference still to FIG. 4, an amplitude of the oscillating motion 48 at the proximal and distal ends of the at least one set of cantilevered bristles 45 is smaller than the oscillating motion 48 in-between the proximal and distal ends, in the form of an oscillating arch. In addition, as can be seen in FIG. 4, the resonant structure 14 includes at least one upper member attached at first and second ends of a length dimension of the at least one set of cantilevered bristles 45, wherein a region of the at least one upper member extending between the first and second ends of the length dimension of the at least one set of cantilevered bristles 45 is not connected thereto.

Figure 5:
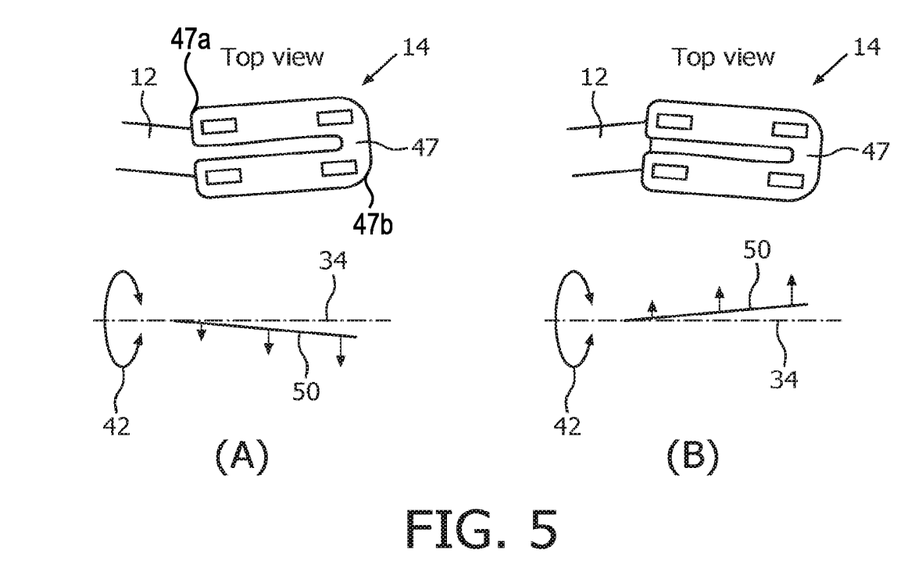

With reference now to FIG. 5, there is shown a top view illustration of another embodiment of an attachment 12 of the present disclosure. The resonant structure 14 comprises a cantilevered platen 47 and the additional motion 50 is a resonant wagging motion 50 that is a motion of the cantilevered platen 47 transverse to the principal axis 34 and has an amplitude (i.e., of the wagging motion) at the proximal end 47a of the cantilevered platen that is smaller than an amplitude of the wagging motion at a distal end 47b of the cantilevered platen. The platen 47 of the resonant structure 14 further comprises suitable beams and weights (e.g., a central beam extending along the length dimension of the platen 47 and weights at corners of the platen), as necessary for providing the desired wagging motion 50. In addition, bristles (not shown) extend from one or more principal surfaces of the platen.

Figure 6:
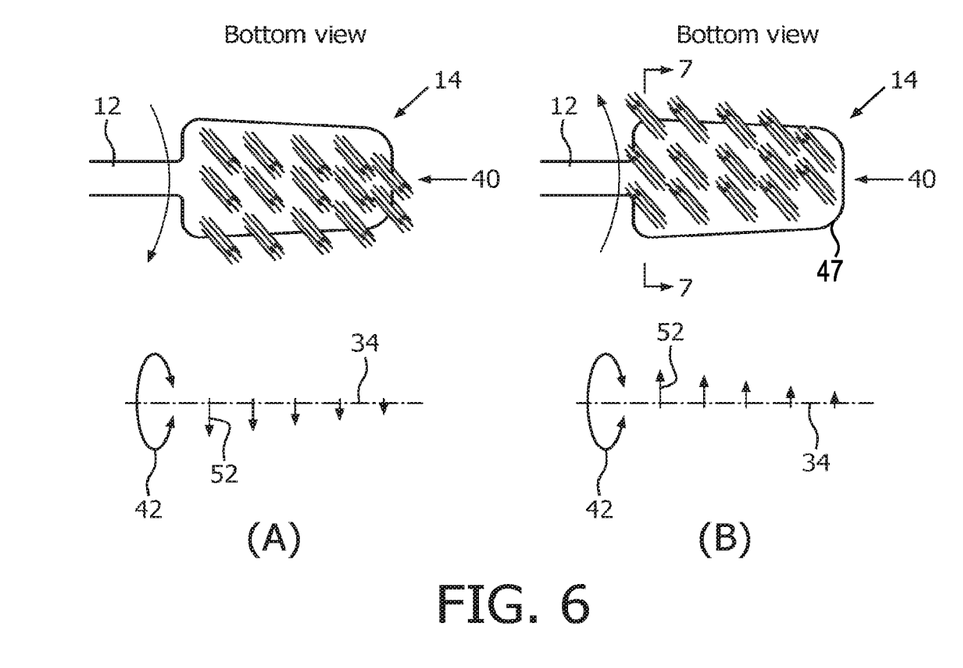

Turning now to FIG. 6, there is shown a bottom view illustration of an attachment 12 with a resonant structure 14 that comprises a cantilevered platen 47 and the additional motion is a waving motion 52 according to an embodiment of the present disclosure. The waving motion 52 includes a motion of a plurality of bristles 40 transverse to the principal axis 34 and has an amplitude (i.e., of the waving motion) at a first end of the cantilevered platen 47 that is larger than an amplitude of the waving motion at a second end of the cantilevered platen 47. In one embodiment, the first end of the cantilevered platen 47 can correspond to the proximal end and the second end can correspond to the distal end. Alternatively, the first end of the cantilevered platen 47 can correspond to the distal end and the second end can correspond to the proximal end.

Figure 7:
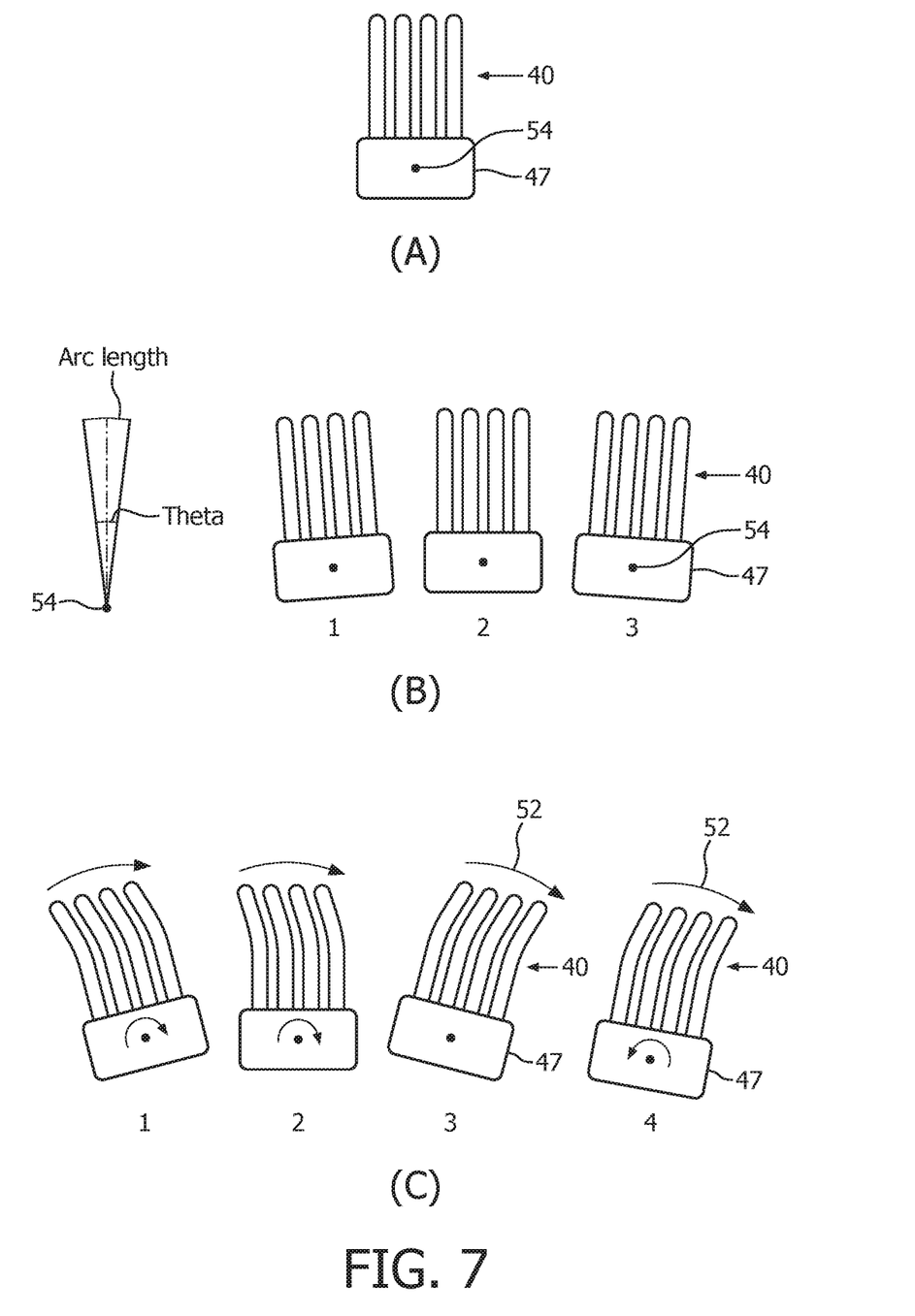

Referring now to FIG. 7, there is shown a cross-sectional view of a platen 47, taken along line 7-7 of FIG. 6, illustrating the waving motion or bristle "whip" according to the embodiment of the present disclosure. Bristle whip occurs in response to the motion of the bristles 40 (i.e., upper portions of the bristles) lagging out-of-phase with the supporting structure (i.e., platen 47). In addition, this is also associated with larger bristle tip amplitudes than what is normally expected. Bristle whip results in increased benefits, such as, much larger in-mouth coverage of bristle cleaning with a much smaller attachment.

Attachments such as brush heads on a drive train for a Philips Sonicare® power toothbrush would normally undergo 10 degrees of rotation, peak-to-peak, under normal loading conditions, similar to the condition illustrated in FIG. 7(B). For a typical brush head, the bristle would move syncronously in-phase with underlying supporting structure. The total amount of motion would be defined by: arc length=θ·r (i.e., theta*radius (from center of rotation 54)).

With bristle whip, however, bristle deflection is designed to occur during normal operation. This means larger amplitudes and the bristles 40 movement lag behind the platen 47 movement. With reference to FIG. 7(C), in Steps 1 and 2, bristles 40 and platen 47 are substantially rotating together in phase (in a first rotational direction). In Step 3, the platen 47 has stopped rotating, but the bristles 40 continue to travel (i.e., clockwise or to the right in the illustration of FIG. 7(C), Step 3). In Step 4, the platen 47 begins to rotate in the opposite direction (i.e., counterclockwise or the left) but due to the rotational inertia of the bristles 40, the bristles 40 continue to rotate in the original direction (i.e., in the first rotational direction).

Figure 8:
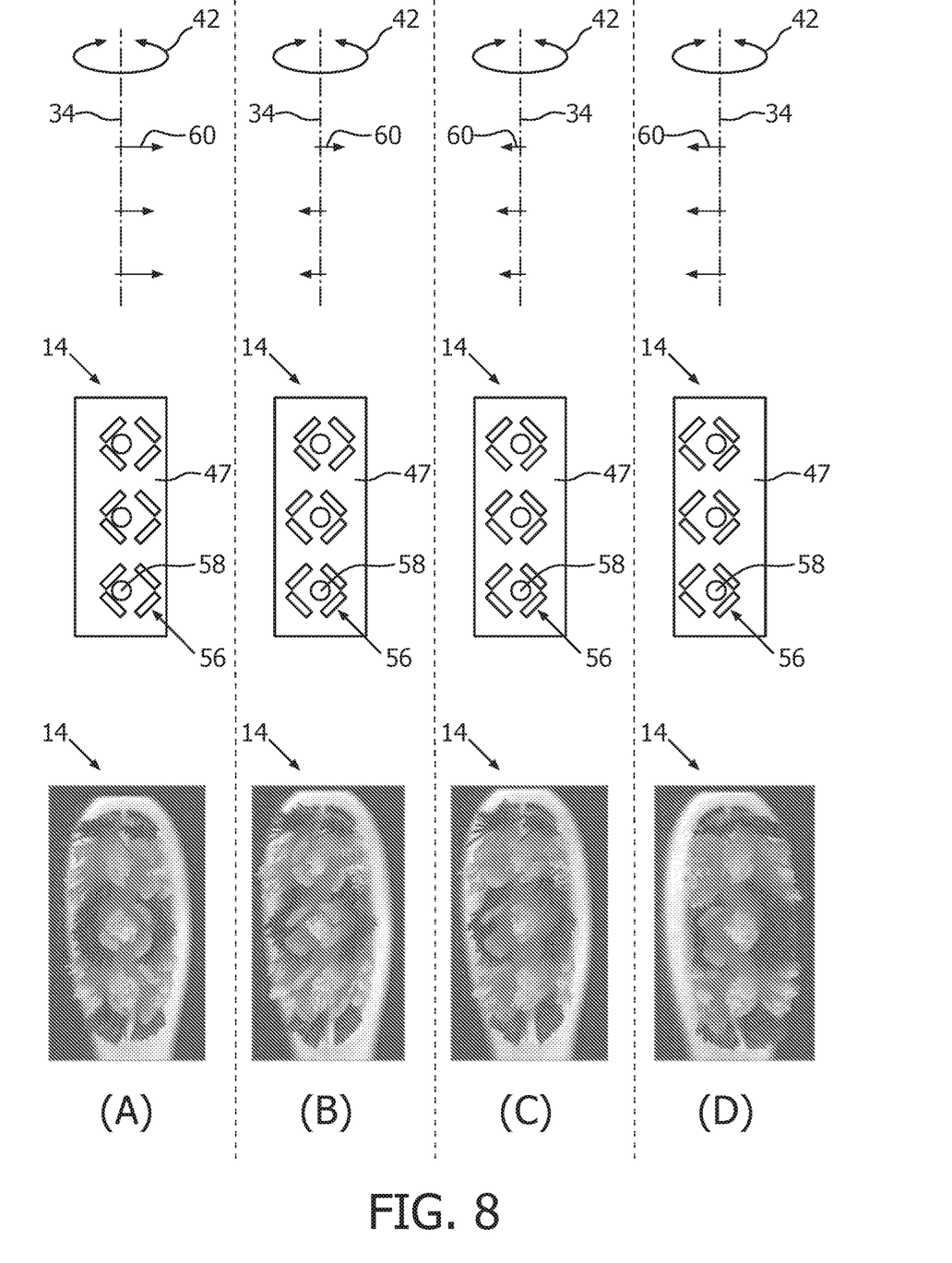

With reference now to FIG. 8, there is shown an illustrative view of an attachment 12 with a resonant structure 14 according to an embodiment of the present disclosure. In the embodiment of FIG. 8, the resonant structure 14 includes one or more sets of a plurality of pliable structures 56 located in a central region and extending from a platen 47 at a principal surface of the resonant structure 14. The resonant structure 14 can also include at least one center bristle tuft 58, disposed within at least one set of pliable structures 56. The pliable structures 56 are operable to exhibit the additional motion, which is a flowing motion 60 and to retain a dentifrice or toothpaste slurry (not shown) within one or more of the plurality of pliable structures 56.

In one embodiment, the pliable structures 56 comprise rubber structures configured for potential toothpaste retention at a center of the bristle tuft. A similar behavior to "bristle whip" occurs, where the tops of the pliable structures 56 lag behind the motion of the platen, as illustrated via the sequence of FIGS. 8(A), 8(B), 8(C), and 8(D), etc. Lagging behind the motion of the platen 47 causes the pliable structures 56 to move almost directly out-of-phase compared to the remainder of the attachment 12. In addition, this causes the center bristle tuft 58 to remain almost motionless during the whole cycle of motion of the attachment 12. Accordingly, this can result in providing the benefits of toothpaste slurry retention on the attachment 12.

Although only a few exemplary embodiments have been described in detail above, those skilled in the art will readily appreciate that many modifications are possible in the exemplary embodiments without materially departing from the novel teachings and advantages of the embodiments of the present disclosure. For example, the embodiments of the present disclosure can be advantageously used in methods for controlling a power toothbrush in dental healthcare applications. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

In addition, any reference signs placed in parentheses in one or more claims shall not be construed as limiting the claims. The word "comprising" and "comprises," and the like, does not exclude the presence of elements or steps other than those listed in any claim or the specification as a whole. The singular reference of an element does not exclude the plural references of such elements and vice-versa. One or more of the embodiments may be implemented by means of hardware comprising several distinct elements, and/or by means of a suitably programmed computer. In a device claim enumerating several means, several of these means may be embodied by one and the same item of hardware. The mere fact that certain measures are recited in mutually different dependent claims does not indicate that a combination of these measures cannot be used to an advantage.

The invention claimed is:

1. A personal care appliance comprising:
    a handle including a drive train and a drive shaft;
        a motor controller for controlling operation of the drive train to produce of a first mechanical stimulus and a second mechanical stimulus; and
        an attachment having a body with a principal axis extending between a proximal end and a distal end of the attachment, wherein the proximal end couples to the drive shaft and wherein the distal end includes a resonant structure, wherein responsive to the motor controller operating to control operation of the drive train to produce the first mechanical stimulus, the resonant structure implements a cleaning motion having a first resonant frequency and wherein responsive to the motor controller operating to control operation of the drive train to produce the second mechanical stimulus, the resonant structure implements the cleaning motion and an additional motion having a second resonant frequency, wherein the additional motion includes of a sinusoidal motion;
    wherein the resonant structure comprises a proximal end and a distal end, and wherein the sinusoidal motion occurs between the proximal end and the distal end of the resonant structure.

2. The appliance of claim 1, wherein the resonant structure comprises at least one selected from the group consisting of at least one branch of cantilevered bristles, at least one set of cantilevered bristles, a cantilevered platen, a plurality of pliable structures, or center bristle tufts within the plurality of pliable structures.

3. The appliance of claim 2, wherein the resonant structure further includes center bristle tufts within the plurality of pliable structures.

4. The appliance of claim 1, wherein the resonant structure comprises at least one branch of cantilevered bristles, the resonant structure having a proximal end and a distal end, and wherein the arching motion includes an oscillation between the proximal end and the distal end of the resonant structure and wherein the proximal end and the distal end of the resonant structure oscillate at a first amplitude and an area between the proximal end and distal end oscillates at a second amplitude where the first amplitude is less than the second amplitude.

5. The appliance of claim 1, wherein the resonant structure comprises at least one cantilevered platen, the cantilevered platen having a proximal end and a distal end, and wherein the wagging motion or the waving motion includes an oscillation transverse to the principle axis wherein the proximal end of cantilevered platen oscillates at a first amplitude and the distal end of the cantilevered platen oscillates at a second amplitude where the first amplitude is less than the second amplitude.

6. The appliance of claim 1, wherein the resonant structure comprises at least one set of cantilevered bristles secured to a cantilevered platen, each bristle of the at least one set of cantilevered bristles having an upper portion and a lower portion, and wherein the whipping motion or the includes an oscillation wherein the upper portion of each bristle of the at least one set of cantilevered bristles oscillates out of phase with the cantilevered platen.

7. The appliance of claim 1, wherein the resonant structure comprises set of cantilevered bristles secured to a cantilevered, the cantilevered platen having a plurality of pliable structures, and wherein the flowing motion includes an oscillation of the cantilevered platen wherein each bristle of the at least one set of bristles oscillates out of phase with the cantilevered platen.

8. The appliance of claim 1, wherein the additional motion further comprises an arching motion, a wagging motion, a waving motion, a whipping motion, or a flowing motion.

9. An attachment for a personal care appliance, comprising:
    a body with a principal axis extending between a proximal end and a distal end, wherein the proximal end couples to a drive shaft that forms a portion of a drive train disposed within a handle of the personal care appliance; and
    a resonant structure disposed at the distal end of the body, wherein (i) responsive to a motor controller within the handle of the personal care appliance operating to control operation of the drive train to produce a first mechanical stimulus, the resonant structure implements a cleaning motion having a first resonant frequency and responsive to the motor controller operating to control operation of the drive train to produce a second mechanical stimulus, the resonant structure implements the cleaning motion and an additional motion having a second resonant frequency in addition to the cleaning motion, wherein the additional motion includes of a sinusoidal motion;
    wherein the resonant structure comprises a proximal end and a distal end, and wherein the sinusoidal motion occurs between the proximal end and the distal end of the resonant structure.

10. The attachment of claim 9, wherein the resonant structure includes at least one selected from the group consisting of at least one branch of cantilevered bristles, at least one set of cantilevered bristles, a cantilevered platen, a plurality of pliable structures, or a center bristle tuft within the plurality of pliable structures.

11. The attachment of claim 10, wherein the resonant structure further includes center bristle tufts within the plurality of pliable structures.

12. The attachment of claim 9, wherein the additional motion further comprises an arching motion, a wagging motion, a waving motion, a whipping motion, or a flowing motion.

13. A method of implementing additional motion in a personal care appliance, comprising:
    providing a handle including a drive train and a drive shaft;

controlling, via a motor controller, operation of the drive train to produce of a first mechanical stimulus and a second mechanical stimulus; and providing an attachment having a body with a principal axis extending between a proximal end and a distal end of the attachment, wherein the proximal end couples to the drive shaft and wherein the distal end includes a resonant structure, wherein responsive to controlling, via the motor controller, operation of the drive train to produce the first mechanical stimulus, the resonant structure implements a cleaning motion having a first resonant frequency and (ii) responsive to controlling, via the motor controller, operation of the drive train to produce the second mechanical stimulus, the resonant structure implements an additional motion having a second resonant frequency in addition to the cleaning motion, wherein the additional motion includes a sinusoidal motion;

wherein the resonant structure comprises a proximal end and a distal end, and wherein the sinusoidal motion occurs between the proximal end and the distal end of the resonant structure.

14. The method of claim 13, wherein the additional motion comprises a resonant motion in addition to the cleaning motion that includes a motion along a trajectory having an angle greater than zero with respect to the principal axis.

15. The method of claim 13, wherein the resonant structure includes at least one selected from the group consisting of at least one branch of cantilevered bristles, at least one set of cantilevered bristles, a cantilevered platen, a plurality of pliable structures, or center bristle tufts within the plurality of pliable structures.

16. The method of claim 15, wherein:

responsive to the resonant structure including the at least one set of cantilevered bristles, the additional motion comprises the sinusoidal motion including at least one selected from the group consisting of (i) along the principal axis and (ii) perpendicular to the principal axis, or, responsive to the resonant structure including the cantilevered platen, the additional motion comprises at least one selected from the group consisting of (i) the wagging motion and (ii) the waving motion, or, responsive to the resonant structure including the plurality of pliable structures located in a central region and extending from a principal surface of the resonant structure, the additional motion is the flowing motion, or, responsive to the resonant structure further including center bristle tufts within the plurality of pliable structures, the additional motion is the flowing motion.

17. The method of claim 13, wherein the additional motion further comprises an arching motion, a wagging motion, a waving motion, a whipping motion, or a flowing motion.

* * * * *